United States Patent
Sheldrake et al.

(10) Patent No.: US 6,375,026 B1
(45) Date of Patent: *Apr. 23, 2002

(54) RADIOTELEPHONE

(75) Inventors: Christopher Bryan Sheldrake, Hampshire; Johnson Keith, Berkshire; Brian James Davidson, Surrey, all of (GB)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,854

(22) Filed: Nov. 19, 1998

(30) Foreign Application Priority Data

Nov. 28, 1997 (GB) ................................. 9725266

(51) Int. Cl.[7] .............................. B65D 8/18; H04M 1/03
(52) U.S. Cl. ............... 220/4.02; 29/525.01; 29/525.11; 379/428.01; 379/433.01; 379/433.04
(58) Field of Search .................. 220/4.02; 379/428, 379/434, 433, 428.01, 433.01, 433.04; 455/90, 555, 575, 128; 340/825.72; 341/176; 174/50; 29/525.01, 525.11

(56) References Cited

U.S. PATENT DOCUMENTS

| | | | |
|---|---|---|---|
| 4,257,121 A | * 3/1981 | Henderson et al. | 455/575 |
| 4,471,493 A | * 9/1984 | Schober | 455/562 |
| 4,945,633 A | 8/1990 | Hakanen et al. | |
| 5,036,432 A | 7/1991 | Uronen et al. | |
| 5,045,973 A | 9/1991 | Saarela et al. | |
| 5,107,404 A | * 4/1992 | Tam | 361/818 |
| 5,357,570 A | * 10/1994 | Tomura et al. | 379/433 |
| 5,546,457 A | * 8/1996 | Tomura et al. | 379/368 |
| 5,547,095 A | * 8/1996 | Sonntag et al. | 220/3.8 |
| 5,655,018 A | * 8/1997 | Estevez-Alcolado De Holl et al. | 379/433 |
| 5,745,566 A | * 4/1998 | Petrella et al. | 379/433 |
| 5,848,152 A | * 12/1998 | Slipy et al. | 379/433 |
| 5,848,718 A | * 12/1998 | Colwell | 220/4.02 |
| 5,867,772 A | * 2/1999 | Jonsson et al. | 455/90 |
| 5,942,352 A | 8/1999 | Neil et al. | |
| 5,946,637 A | 8/1999 | Umbach et al. | |
| 6,084,962 A | 7/2000 | Plenge | |
| 6,102,743 A | 8/2000 | Haffenden et al. | |

FOREIGN PATENT DOCUMENTS

| | | | |
|---|---|---|---|
| EP | 351863 | * | 3/1996 |
| GB | 2252219 | * | 7/1992 |
| GB | 2293517 | * | 3/1996 |

* cited by examiner

*Primary Examiner*—Stephen P. Garbe
*Assistant Examiner*—Joseph C. Merek
(74) *Attorney, Agent, or Firm*—Perman & Green, LLP

(57) ABSTRACT

A housing assembly for a radiotelephone comprising, a first housing having an aperture; a second housing; attachment means forming part of a moulding for fixing to the first housing having an engaging element for inserting through the aperture of the first housing for attaching the first and second housings.

26 Claims, 1 Drawing Sheet

RADIOTELEPHONE

FIELD OF INVENTION

This invention relates to a housing assembly for a radiotelephone.

BACKGROUND OF INVENTION

A radiotelephone, typically, consists of at least two housings, a front and rear housing, for containing the electronic components necessary for the radiotelephone to operate. These housings are normally fixed together by means of screws which are inserted through apertures in the rear housing. These screws are screwed into sockets which are fixedly connected to the inside of the front housing. This approach ensures that the attaching means is not visible to the user during operation. This avoids the user having to see screw heads or other attachment means, such as rivets, which can distract from the distinctive appearance of the radiotelephone.

However, with the dramatic reduction in the size of recent generation radiotelephone it is becoming increasing more difficult to incorporate the required screw sockets to the inside of the front housing, hence increasing the complexity of the manufacturing process. Further, with the continuing need for manufactures to distinguish their products from those of their competitor, different materials for the radiotelephone housing are being considered. Not all these material type lend themselves to having fixing means incorporated into the housing design.

SUMMARY OF THE INVENTION

In accordance with an aspect of the present invention there is provided a housing assembly for a radiotelephone comprising a first housing having an aperture; a second housing; attachment means forming part of a moulding for fixing to the first housing having an engaging element for inserting through the aperture of the first housing for attaching the first and second housings.

Preferably the first housing is a front housing which is presented to a user during operation and wherein the second housing is a rear housing.

Preferably the engaging element is a screw boss.

Preferably the engaging element is a mechanical joint suitable for a push fit connection.

Where preferably the moulding is a graphics moulding.

Where preferably the moulding is a window moulding.

The window and graphics moulding can be used to conceal the functional aspects of the engaging element ensuring that no visible external fixings are seen by the user during operation of the radiotelephone.

Preferably the front housing is manufactured from pressed metal.

This invention is particularly suited for housings manufactured out of metal. Typically metal housings are formed from flat sheets where it is difficult to incorporate functionality for attaching the radiotelephone housings. Using an aperture on the front face through which attaching means are inserted simplifies the manufacture of the front housing and is particularly suited for attaching press metal housings.

Press metal housings can be made thinner than housings made from conventional housing materials resulting in a overall reduction in size and weight of the radiotelephone.

The use of a metal housing can have the advantage of increased electromagnetic shielding and/or electrostatic discharge protection. The additional protection provided by the metal housing can result in a reduced component count.

0.8mm thick Aluminum is the preferred metal for use in the manufacture of radiotelephone housings.

The use of metal housings will have an effect on the radiation patterns of the antenna which can enhance the emission characteristics of the radiotelephone.

Attaching housings according to the present invention allows the manufacture of the radio telephone to be completed in a single axis, simplifying the manufacturing process.

BRIEF DESCRIPTION OF THE DRAWINGS

Examples of apparatus in accordance with the invention will now be described, by way of example only, with reference to the accompanying drawing, in which.

DETAILED DESCRIPTION OF THE INVENTION

Figure 1:
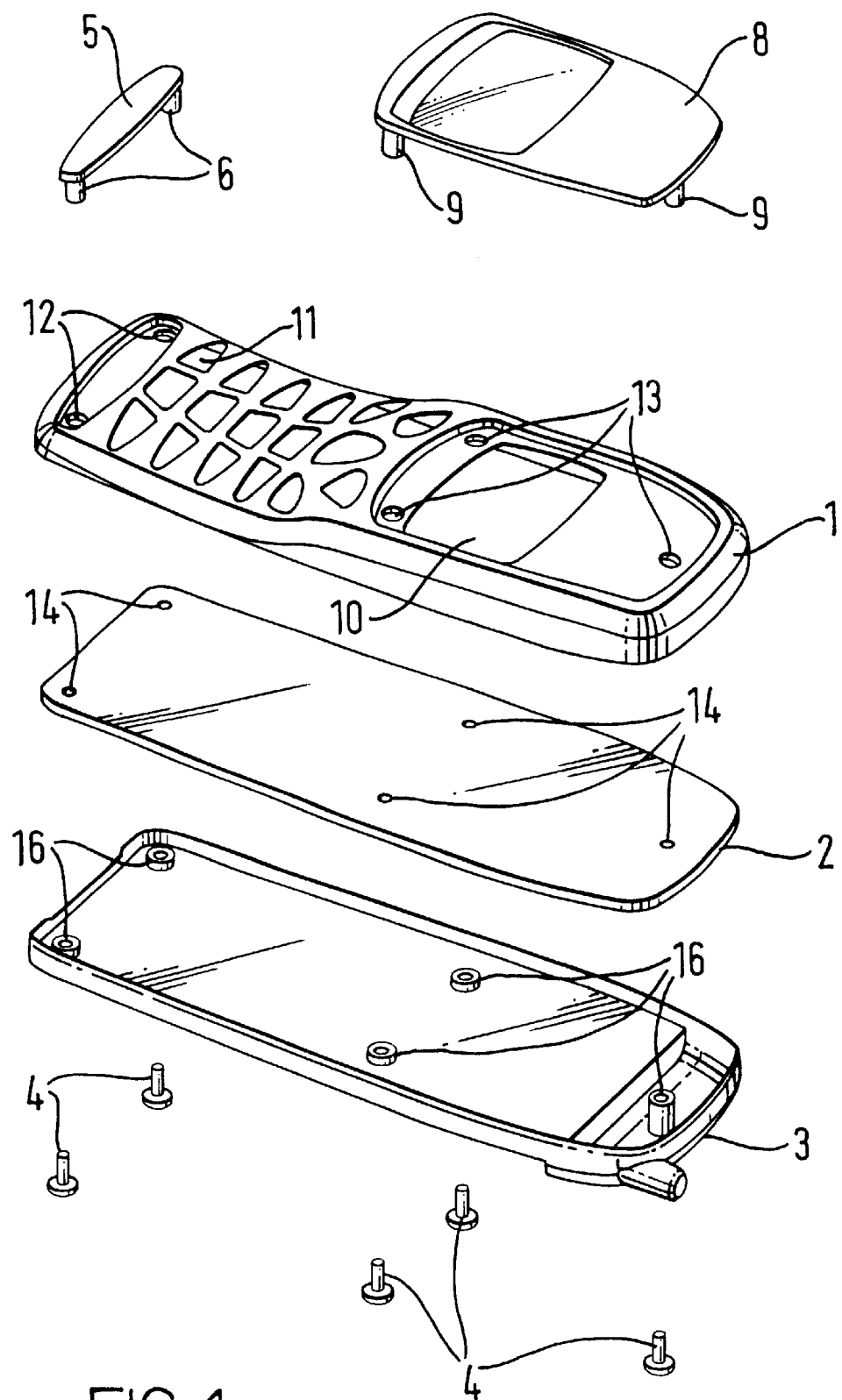
FIG. 1 shows an exploded view of a radiotelephone of an embodiment of the invention.

FIG. 1 shows a portable phone having a metal front housing 1, a PCB assembly 2, a rear housing 3, a plurality of screws 4, a graphics moulding 5 with integral screw bosses 6, and a window moulding 8 with integral screw bosses 9.

In the preferred embodiment the front housing 1 is manufactured from press metal having a thickness of 0.8mm, however any suitable material can be used. The front housing 1 has an aperture 10 for the telephone's display (not shown), a plurality of through-openings 11 through which components inside the front and rear housings 1, 3 partially project (not shown), apertures 12 through which screw bosses 6 are inserted, and apertures 13 through which screw bosses 9 are inserted.

The PCB assembly 2 has a plurality of apertures 14.

The rear housing 3 has a plurality of apertures 16.

The radiotelephone is assembled in a single axis where the rear housing 3 and the front housing 1 are connected to one another using screws 4. Where screw 4 are projected upward through apertures 16. The PCB assembly 2 is designed to be integral with the upper surface of the rear housing 3. When the PCB is correctly mounted on the rear housing the apertures 14 are coaxial with apertures 16 through which the screws 4 project. The PCB assembly 2 may, however, be attached to the housings 1, 3 by other suitable means which would be known to the person skilled in the art.

The screw bosses 6, 9 are inserted into the apertures 12 and 13 respectively.

To secure the rear housing 3 and front housing 1 the screws 4 are screwed into screw bosses 6, which are fixedly connected to the graphics moulding 5, and screw bosses 9, which are fixedly connected to the window moulding 8. In this embodiment the graphics moulding 5 and window moulding 8 conceal the functional aspects of the mouldings, in this embodiment the screw bosses, from the user.

The screw bosses can be replaced with other forms of engaging elements. For example, a mechanical joint suitable for a push fit connection with a corresponding element on the other housing. This corresponding element may either be moulded to the other housing or insertion through an aperture in the other housing.

This invention is equally applicable for fixing a rear metal housing to a front housing using a moulding with screw bosses for inserting through an aperture in the rear housing.

This invention can be used for fixing two metal housings together using two mouldings, one for each housing.

The present invention enables the front housing 1 and rear housing 3 to be secured together without having the complexity of designing into the front housing fixing means. This simplifies the housing manufacturing process and allows a greater variety of materials and designs to be used.

The present invention may include any novel feature or combination of features disclosed herein either explicitly or implicitly or any generalisation thereof irrespective of whether or not it relates to the present claimed invention or mitigates any or all of the problems addressed. In view of the foregoing description it will be evident to a person skilled in the art that various modifications may be made within the scope of the invention. For example, it will be appreciated that a bolt may be used in place of a screw.

We claim:

1. A housing assembly for a radiotelephone comprising: a first housing having at least two apertures in at least one recessed portion of the first housing;
    a second housing having at least two apertures therein, each aperture in the second housing corresponding to a location of each aperture in the first housing; and
    at least one attachment member adapted to be inserted into the recessed portion of the first housing, the attachment member including at least two engaging elements adapted to be received into a corresponding one of each aperture in the first housing and be engaged by an attachment element that is inserted into the corresponding aperture in the second housing, wherein the first and the second housing are securely attached together by engagement of the engaging element and the attachment element.

2. A housing assembly according to claim 1, wherein the first housing is a front housing which is presented to the user during operation of the radiotelephone and wherein the second housing is a rear housing, and wherein an electronics assembly for the radiotelephone is located between the first housing and the second housing and secured in place by engagement of the attachment element and the engaging element.

3. A housing assembly according to claim 1, wherein the engaging element comprises a screw boss.

4. A housing assembly according to claim 1, wherein the engaging element and the attachment element form a mechanical joint suitable for a push fit connection.

5. A housing assembly according to claim 1, wherein one of the attachment member is a moulding member that is adapted to be inserted into the recessed portion in the first housing and includes a graphic design on a portion of the moulding member that is visible to the user.

6. A housing assembly according to claim 1, further comprising a display between the front and rear housings and wherein a display attachment member is positioned in a corresponding recessed portion in the first housing over an opening in the front housing corresponding to a position of the display, the display attachment member having a window opening to enable the display to be visible to the user during operation of the radiotelephone.

7. A housing assembly according to claim 1, wherein the front housing is metal.

8. A housing assembly according to claim 1 wherein the at least one attachment member comprises a first moulding having two engaging elements and a second moulding having three engaging elements.

9. A housing assembly according to claim 1 wherein the attachment element comprises a screw for inserting through the at least one aperture of the second housing wherein the attachment element projects through the aperture in the second housing and engages the engaging element and to secure the first housing to the second housing.

10. A housing assembly according to claim 1 wherein the engaging element of each attachment member is integrally formed in the attachment member.

11. A housing assembly according to claim 10 wherein each aperture in the second housing includes a body portion extending above an interior surface of the second housing and wherein an end portion of the attachment element projects above an end portion of the body portion.

12. The housing assembly of claim 1 wherein the attachment element and engaging element are not an integral part of the housing assembly.

13. The housing assembly of claim 1 further comprising an electronics assembly board adapted to be secured between the first and the second housings, wherein a portion of each attachment element projects above a body portion of each aperture in the second housing and wherein the electronics assembly board includes at least one corresponding aperture to receive the projecting portion of the attachment element and wherein the projecting portion of the attachment element extends and engages the engaging element.

14. A housing assembly for a radiotelephone comprising:
    a first housing including at least two first apertures, the first apertures being located in at least one recessed section on an outside surface of the first housing;
    a second housing including at least two second apertures, each second aperture corresponding to a location of each of the first apertures; each second aperture including a body portion extending from an inner surface of the second housing;
    at least one attachment member, the attachment member including at least two engagement elements fixedly connected thereto, the engagement element adapted to be received into a corresponding one of the first aperture; and
    at least one coupling element adapted to be received into the second aperture from an exterior surface of the second housing and engage a corresponding one of the engaging element to fixedly secure the first housing to the second housing.

15. The housing assembly of claim 14 wherein the engaging element is a screw boss and the coupling element is a screw.

16. The housing assembly of claim 14 wherein the engaging element and the coupling element comprise corresponding elements of a push fit connection.

17. (New) The housing assembly of claim 14 further comprising an electronics assembly board located between the first and second housings, wherein the electronics assembly board includes one or more apertures, and wherein the board is adapted to rest on the body portion of the second housing and wherein the coupling element is adapted to pass through the aperture in the board to position the board between the first and second housings.

18. The housing assembly of claim 14 wherein the at least one attachment member comprises a first attachment member comprising a display molding adapted to cover a display area of the radiotelephone, and a second attachment member comprising a graphics molding adapted to carry a graphic image thereon.

19. A method of assembling a radiotelephone having a first housing and a second housing, the method comprising the steps of:
    inserting at least one attachment member including at least two engaging elements fixedly connected thereto into a corresponding receiving area on a front surface of the first housing, wherein each engaging element is received into a corresponding aperture in the receiving area of first housing;

positioning the first housing including the attachment member over a corresponding side of the second housing wherein an electronics assembly board is located between the first and second housing;

inserting a coupling element into each aperture in a rear side of the second housing, wherein the coupling element extends through the aperture in the second housing and engages a corresponding engaging element in the aperture of the first housing, and secures the first housing to the second housing with the electronics assembly board therebetween.

20. The method of claim 19 wherein the step of inserting a coupling element further comprises the step of positioning at least one aperture in the electronics board assembly over a portion of a corresponding coupling element projecting from the at least one aperture in the second housing.

21. The method of claim 19 wherein the coupling element is inserted into the corresponding aperture of the second housing and is received into the corresponding engaging element of the first housing.

22. A housing assembly for a radiotelephone having first and second housings, the first and second housings adapted to be coupled together by engagement of an attachment molding to at least two attachment elements, the attachment molding comprising:

a first member adapted to be received in a recessed portion of a first housing of the radio telephone, and at least two second members extending from the first member adapted to be received into a corresponding aperture in the recessed portion of the first housing, wherein each second member is adapted to be engaged by a complimentary attachment element extending from a second housing of the radio telephone, wherein the engagement of the complimentary attachment element into the second member secures the first housing to the second housing.

23. The housing assembly of claim 22 wherein the second member is a screw boss integrally formed in the first member and the attachment element is a screw.

24. The housing assembly of claim 22 wherein the attachment molding is a display cover and includes an opening to allow a display of the radiotelephone to he received.

25. The housing assembly of claim 22 wherein the attachment molding comprises a graphics molded having a front portion adapted to display a graphic symbol or text.

26. The housing assembly of claim 22 wherein an end of the second member opposite the first member is adapted to be positioned against one side of an electronics assembly board in the radiotelephone, an other side of the electronics assembly board resting against an aperture member in the second housing through which each complimentary attachment element extends, wherein when each complimentary attachment element extends through the electronics assembly board and engages the corresponding second member, the electronics assembly board is securely positioned between each second member and aperture member.

* * * * *